March 5, 1935.  A. KINDELMANN ET AL  1,993,101
LENS SHIFTING AND INDICATING MECHANISM
Filed Jan. 10, 1931   6 Sheets-Sheet 4

INVENTORS
Albert Kindelmann
Ewald Boecking
BY
ATTORNEYS

March 5, 1935. A. KINDELMANN ET AL 1,993,101
LENS SHIFTING AND INDICATING MECHANISM
Filed Jan. 10, 1931 6 Sheets-Sheet 5

Fig. 6.

INVENTORS
Albert Kindelmann.
Ewald Boecking.
BY
ATTORNEYS

March 5, 1935.　　A. KINDELMANN ET AL　　1,993,101
LENS SHIFTING AND INDICATING MECHANISM
Filed Jan. 10, 1931　　6 Sheets-Sheet 6

INVENTORS
Albert Kindelmann.
Ewald Boecking.
BY
Austin & Orr
ATTORNEYS

Patented Mar. 5, 1935

1,993,101

UNITED STATES PATENT OFFICE 1,993,101

LENS SHIFTING AND INDICATING MECHANISM

Albert Kindelmann, Floral Park, and Ewald Boecking, Brooklyn, N. Y., assignors to International Projector Corporation, New York, N. Y., a corporation of Delaware Application January 10, 1931, Serial No. 507,830

12 Claims. (Cl. 88—57)

This invention relates to motion picture machines and has particular reference to motion picture projectors and has especial reference to lens mounts constructed and arranged to provide a plurality of lenses for use in the machine in connection with different types of film which are now employed in the industry.

A main object of this invention is to provide a simple, compact, and efficient device whereby the separate lenses in the mount of turret may be each separately and independently adjusted when desired to align their optical axes with the projection axis presented thereto by the particular type of film being employed at the instant.

A further object is to provide a simple and efficient shift device whereby the movement of the lens to the proper alignment will be readily quickly and easily effected with a minimum of time and effort on the part of the operator.

A further and important object is to make the shift accurate and certain and capable of being achieved even while other manipulations of the machine are taking place at the same time.

A still further object is to provide means whereby the arrival of the lenses in the proper alignment will be automatically indicated in one way or the other so that the operator will know that such condition has been achieved.

Further and more specific objects, features, and advantages will more clearly appear from the detailed description given below when taken in connection with the accompanying drawings which form part of the specification and which illustrate a present preferred form of the invention.

In general, the invention includes a support for a plurality of lenses, which support is adjustable either by sliding motion vertically or sidewise or at an angle or by rotation thereof. In combination with the support there are simple means for latching the support in a plurality of positions as the lenses are successively aligned as desired with the optical axis. Combined with the latching means are indicating devices which readily indicate to the operator at a glance, which of a plurality of lenses is in line with the optical axis of the machine. The movement of the supports automatically change the indicating means so that there is always a time indication that the operator can rely upon. With the lens support provided with a plurality of lenses adapted for practical use in connection with these different types of film, with the support readily adjustable to move one or another of the lenses into alignment with the optical axis of the machine and with latching means for holding the support in adjusted position and indicating means permitting ready observation of the various positions, it is a simple matter for the operator, accurately and easily to know just what condition the lens system is in at any given time.

The invention further comprises a pivotal support for each lens mount and a readily movable device for shifting and adjusting each mount around this pivotal axis whereby the optical center of each lens may be brought into alignment with the optical center of various types of films with ease and accuracy. It is certainly well known that the centers of the picture section of the regular film, regular movietone film, "Grandeur" film and "Grandeur" film modified for "Movietone", are different in each case when they are run through a machine of the type set forth herein. It therefore becomes exceedingly important to be able to readily and quickly shift whatever lens may be in line with the projection beam to adjust it to the center of whichever film may be passing the projector opening. Consequently the simple manually operable knob and cooperating shaft is provided so that the lower end of the mount is swung to pivot the mount around the upper supporting axis and thereby adjust the axis of the lens as desired.

Associated with each of the shifting devices are indicia which may be represented by colors or characters or both. These indicia for the shifting device are presented into a definite position observable by the operator to indicate a particular axis with which the lens in that position is aligned. Each lens mount is shiftable independent of the others. The shifting device and the indicia associated therewith are so simple that any one even not skilled in the operation of such machines could readily manipulate these devices.

Furthermore, the invention as represented in the present preferred form comprises a rotatable turret mounted within a suitable frame on the main frame of the machine and is provided with cooperating bearings to roll easily therewithin and also provided with suitable stop elements to temporarily stop and retard it at predetermined points so that the several lenses in the turret may be respectively aligned with the optical axis depending upon which lens is to be employed. The invention furthermore includes a series of light tubes at the rear of the turret which are movable to cooperate with the film aperture gate to contact therewith at all times to shield the projection light as it passes through the aperture and the turret and to move readily therewith as the gate is moved away from the aperture plate in the threading of the film and whenever the gate is moved away from the aperture plate for any other reason. The reason for requiring the several lenses on the turret is because the present machine illustrated herein is intended to be adapted for use with several types of film as follows: (a) the ordinary film; (b) the regular film adapted for "Movietone"; (c) the 70 millimeter or small film; and (d) the "Grandeur" film for "Movietone". These films not only have different optical axes in the machine which require the lens to be aligned, but also take in varying fields of vision on the screen.

The preferred form illustrated briefly comprises a rotatable shaft at the lower side of each mount provided with a groove in which rides a tooth mounted on the lens device as the shaft is rotated, the tooth as mounted on the lens mount is swung about its upper pivotal axis. The shifting device is provided with automatic stop means for each end of its travel.

The present preferred form of the invention is shown in the drawings of which

Figures 4, 5:
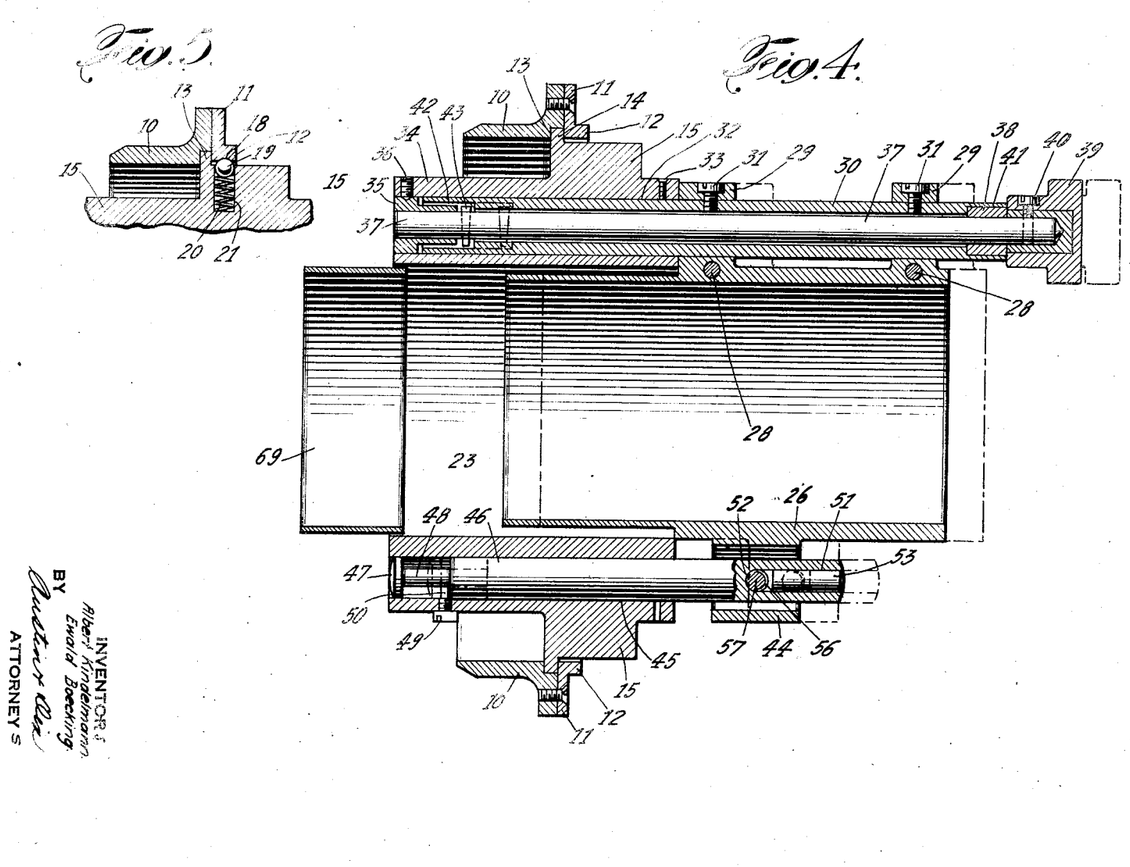
Fig. 4 is a vertical longitudinal sectional view taken on the line 4—4 of Fig. 1.
Fig. 5 is a transverse sectional view taken on line 5—5 of Fig. 1.
Figure 6:
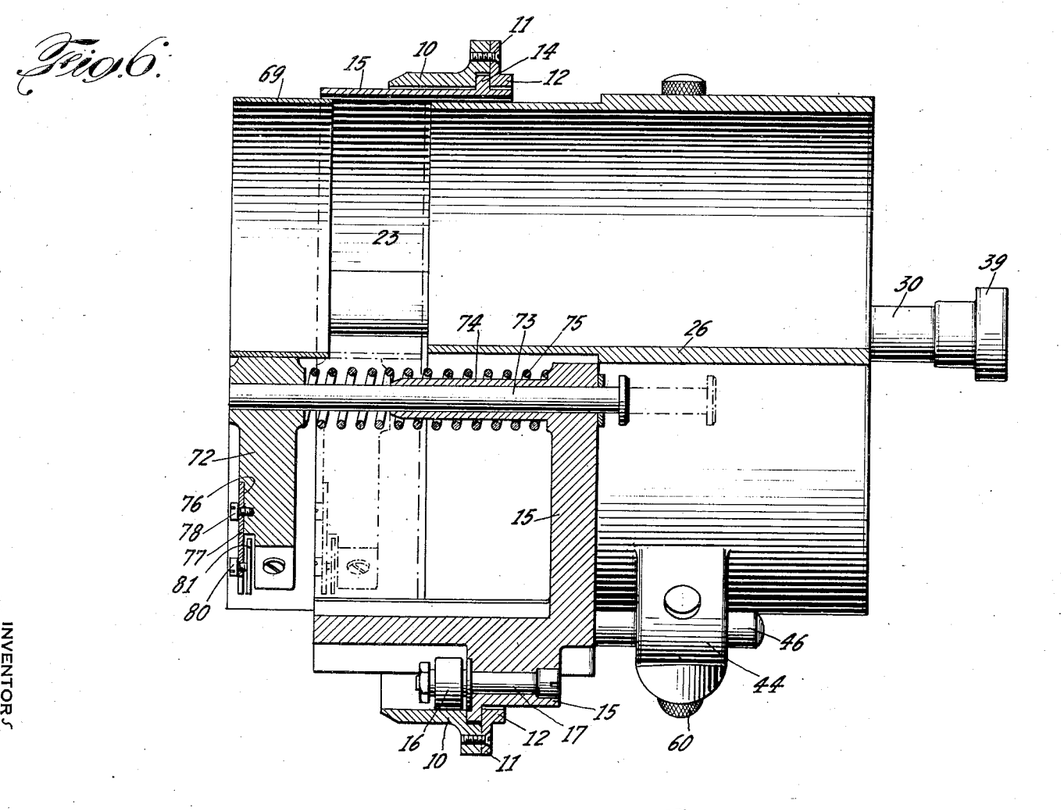
Fig. 6 is a horizontal sectional view taken on the line 6—6 of Fig. 1.

The present preferred form of the invention includes a rotatable turret for a plurality of lenses, which turret is mounted to rotate in a ring element 10, Fig. 4, which may be formed integrally with the main supporting frame of the machine or may be separate element fastened to the frame in any suitable manner. This ring 10 has screwed thereto a ring 11 with a flange 12. The ring 10 is provided with a groove 13 in which rides a projecting flange 14 on the periphery of the turret element 15 and which is held in position in the groove 13 by means of the auxiliary ring 11. As shown particularly in Fig. 6, a roller 16 projects from the inner face of the turret element 15 and is rotatably mounted on a stub shaft 17 journalled in the turret element 15. There preferably are several of these rollers and stub shafts disposed around the inner face of the turret element 15 so that the turret can easily and readily be rotated within the ring 10.

Around the inner face of the ring element 10 there are disposed a plurality of notches or indentations such as 18 at predetermined points and in these notches engage balls such as 19 backed by springs 20 disposed in bores such as 21 in the turret element 15. Preferably the indentations 18 are disposed at equal distances apart and in such positions relative to the ring and the turret element that the lenses mounted on the turret element 15 will be positioned in predetermined positions and latched therein by this means when desired. In the present case this means is used to respectively align one or the other of the lenses on the turret 15 in alignment with the projection axis and to provide a simple and ready means whereby the alignment can be easily effected. Other types of positive locating means may be employed if desired.

The turret element 15 is provided with a plurality of openings extending therethrough and in the form shown there are three indicated by the numerals 22, 23 and 24. These openings are preferably spaced equi-distant angularly in the turret element 15 and through them the projection light passes, one at a time as they are respectively disposed in line with the projection beam axis. At the front of the element 15 and projecting partly into the openings 22, 23 and 24 are disposed lens holding tubes such as 25, 26 and 27. Each of these tubes is provided with the usual tightening screw 28, and has an apertured ear portion 29 to receive an elongated sleeve 30. The sleeve and the ear portions are held together by means of the set screw 31. The sleeve 30 is held in snug sliding engagement within a bore 32 in the turret element 15 as shown particularly in Fig. 4. One end of the sleeve 30 extends into a continuation of the bore 32 which is disposed in a rearwardly extending sleeve 34 projecting from one face of the turret element 15.

In the end of the sleeve 34 there is fixed a plug 35 by means of screw 36. This plug is bored and threaded to receive the threaded end of shaft 37 which extends all the way through the sleeve 30 and extends beyond the same at the opposite end of the sleeve 30. At the free or operating end of the shaft 37 there is fastened thereto a plug 38 and on this plug 38 there is mounted an operating thumb piece 39. The plug 38 and the thumb piece are held on to the shaft 37 by means of the screw 40. The plug 38 fits into a recess 41 in the end of the sleeve 30. The plug 35 in part extends into a recess 42 in the other end of the sleeve 30, and between the inner face of the plug 35 and the inner face of said recess there is disposed on the shaft 37 a key element 43, which is adapted to engage the end of sleeve 30 in one direction of movement of the shaft to move the sleeve.

It will be noticed from Fig. 4 that the inner end of each of the lens tubes such as 26 has sufficient clearance within its respective bore in the turret element 15 so that the tube and associated parts can be swung to new positions to align with different optical axes, thus each lens tube may be moved in respect to the axis of the bore 32 in the turret element 15. This swinging motion is desirable for the purpose of aligning any particular lens with one of several projection axes or with the optical center of one of several types and sizes of films which may be used in this machine.

Figure 1:
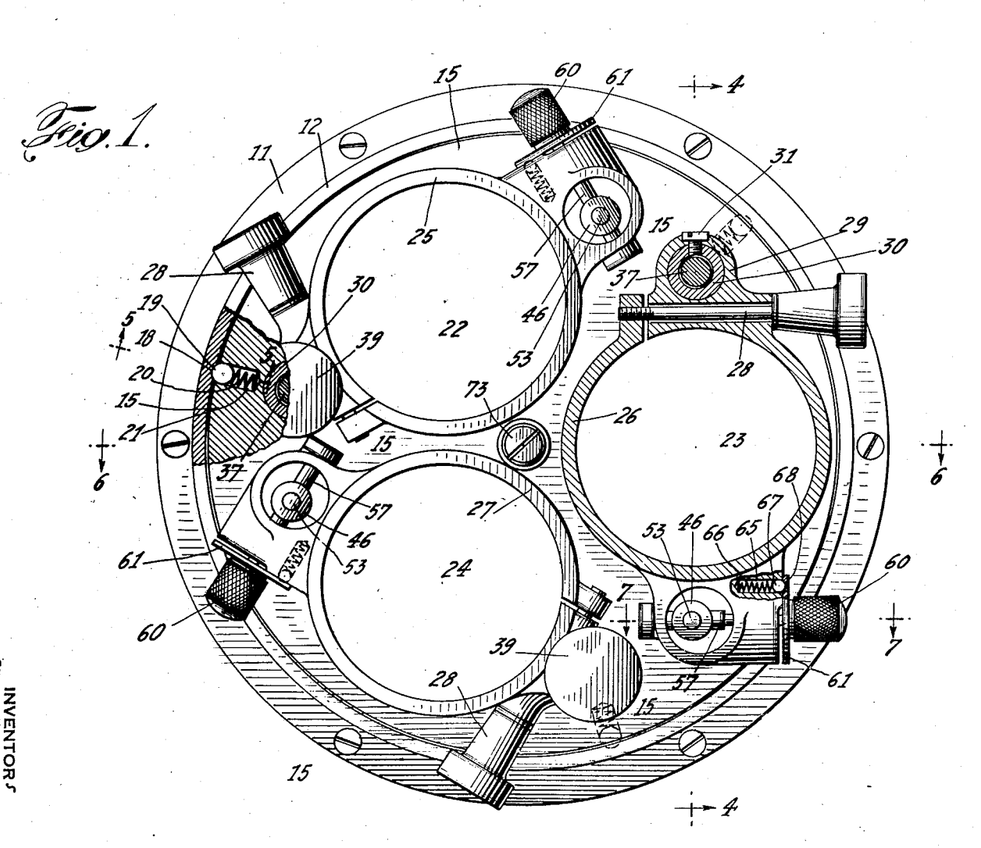
Fig. 1 is a front elevational view of the turret with certain portions broken away.
Figure 2:
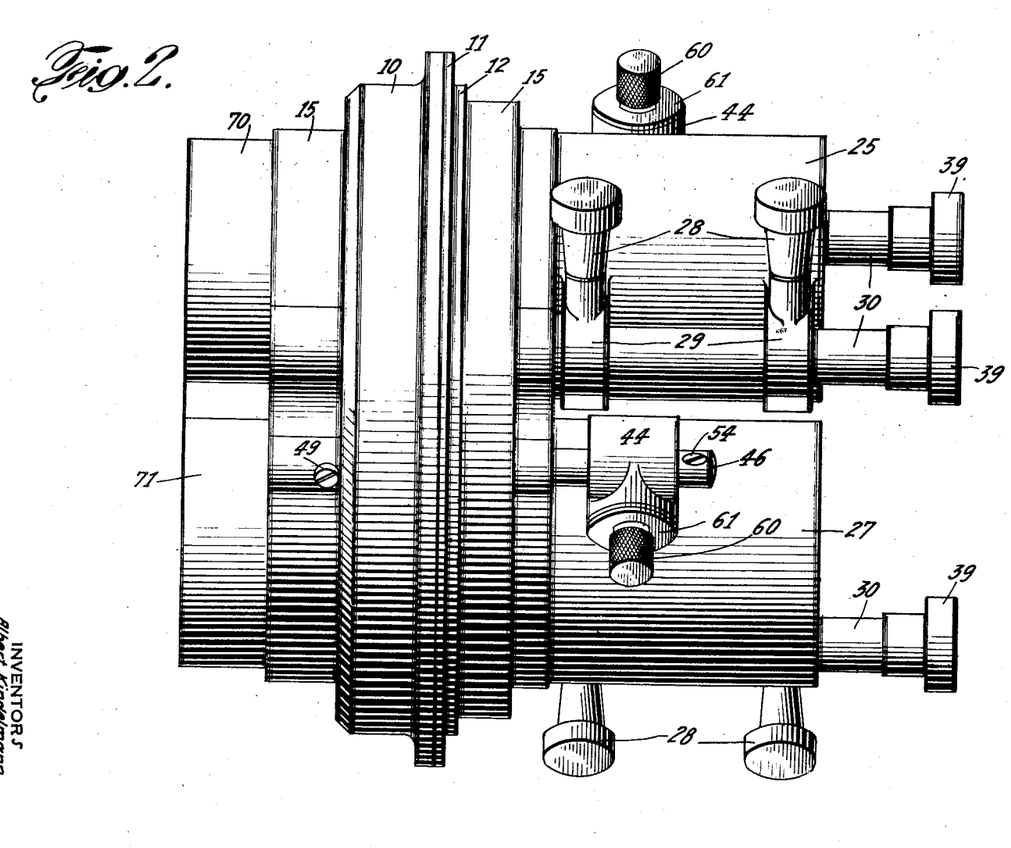
Fig. 2 is a side elevation of the turret.

In order to effect this swinging motion in a suitable and ready manner each of the lens tubes 25, 26 and 27 are provided on some convenient place on their peripheries with an ear such as 44. Disposed on the turret element 15 in line with each of the axes of the ears 44 there is provided a bore such as 45. In this bore which is rather elongated there is slidably disposed a shaft 46. The one end of the shaft 46 has a head 47 and adjacent thereto a reduced portion 48. In the turret element 15 adjacent the reduced portion 48 of the shaft 46 is disposed a set screw 49 having a pin portion 50 extending partly into the bore 45 to act as a stop for the shoulders formed on the shaft 46 by the reduced portion 48 thereof and thereby limit the movement of the shaft 46 in either direction, longitudinally of the projector. The forward end of the shaft 46 extends through the bore in the ear 44 and this portion of the shaft 46 is provided with a longitudinal bore 51 and a transverse bore 52. In the bore 51 there is disposed a stub shaft 53 held therein by screw 54 (Fig. 7), and having on its inner end a tooth 55. This tooth is adapted to engage with a spiral groove 56 in a transverse shaft 57 extending through bore 52 and journalled at 58 and 59 in the ear 44. The outer end of this shaft 57 is provided with a thumb element 60 and an indicator dial or disk 61 on which suitable indications such as 62 may be disposed as desired. A spring 63 is disposed beneath the dial 61 and the bottom of a recess 64 in the ear 44 in which it is disposed. Another bore 65 (Fig. 2) in the ear 44 holds a spring 66 which presses a ball 67 into one or another of several notches or indentations 68 on the under side of the dial 61.
Disposed and housed within the rear face of the turret element 15 are three auxiliary tubes such as 69, 70 and 71, Figs. 4 and 5, the axes of which are in alignment with the axes of the lens tubes 25, 26 and 27 in the front of the turret element 15. These tubes 69, 70 and 71 are mounted on and carried by a spider frame such as 72, (see Fig. 6) mounted on a central rod 73 slidably journalled in a sleeve 74 mounted centrally of the turret element 15 and extending from the rear face thereof. Between the rear face of the turret element 15 and the rear face of the spider member 72 there is disposed a spring 75 around the rod 73 and the sleeve 74. The rod 73 and with it the spider 72 carrying the tubes 69, 70 and 71 may be slid in and out of the turret element 15 and the spring 75 will always tend to keep the tubes in the position outwardly shown in Fig. 6. This position is the one in which these tubes on their outer faces will bear against the adjacent face of a film aperture gate, not shown. Between each pair of the tubes 69, 70 and 71 there is disposed on the spider element 72 a shallow depression 76 in which is disposed a triangular plate such as 77, (see Fig. 3) held therein by a screw 78. This plate in each instance has at its bottom a cut 79 therein. Back of the plate 77 adjacent the cut 79 there is rotatably mounted by screw 80 a plate 81 which carries certain indicia such as 82. It will be noted that the indicia 82 are disposed at the rear of the turret in association with the auxiliary tubes, each indicia being disposed adjacent the lenses to which its color and character are limited so that as the lens is aligned with the optical axis, near the center of the machine, its corresponding indicia is disposed opposite it near the top of the machine so that it is readily observable by the operator either through the glass of the door or when the door is open.
Operation of the device

Having now described the parts and their assembly and part of their cooperation, the actual functioning will be described.
*To rotate the turret.*—The turret member 15 is merely gripped in the hand, turned against the retarding action of the plurality of balls 19 lying in the notches 18 in the ring 12. These notches are so disposed that when the balls lie therein at least one of the lens tubes is in proper alignment with the desired optical axis. When a new lens is to be aligned, the turret is turned until the desired lens is in position and when it is so the balls will click into position, and the operator can tell by the slight resistance thus offered that the proper position has been reached.

The lenses properly located in their holding sleeves are introduced into the holding tubes and are fastened therein by tightening of the screws 28.

*To focus the lenses.*—Referring particularly to Fig. 4, the turning of the thumb piece 39 will turn the shaft 37. This being threaded in the fixed plug 35 will cause the shaft 37 to move to the right or the left in accordance with the turning movement thereof and will advance or withdraw the lens tube which is connected to that particular shaft 37 since the lens tube ear such as 29 is screwed to the sleeve 30. This sleeve 30 is forced to the right by means of pin or key 43 and to the left by means of plug 38. As the lens tubes are thus focused their stop limits are also determined by the pin 50 engaging with the shoulders on the stub shaft 46 at the bottom of the turret 15. This is true because as the ear 44 on each lens tube moves to the right or the left it carries with it the transverse shaft 57 and the stub shaft 46 which slides in the bore 45 of the turret element 15. It will be understood that each lens tube can be thus separately focused. The construction above described with regard to one lens and its holder and operation applies to each and all of them both as to the focusing and as to the lateral shifting of the tubes for the alignment of the same tube with one or more of several different projection axes.

Figure 7:
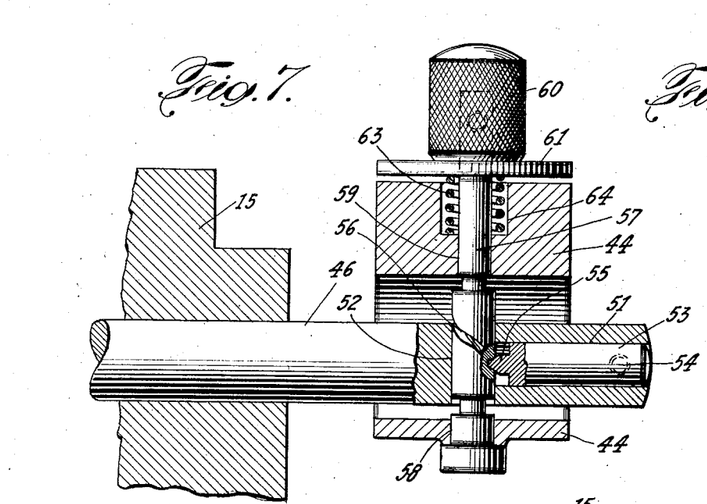
Fig. 7 is an enlarged horizontal sectional view taken on the line 7—7 of Fig. 1.
Figure 8:
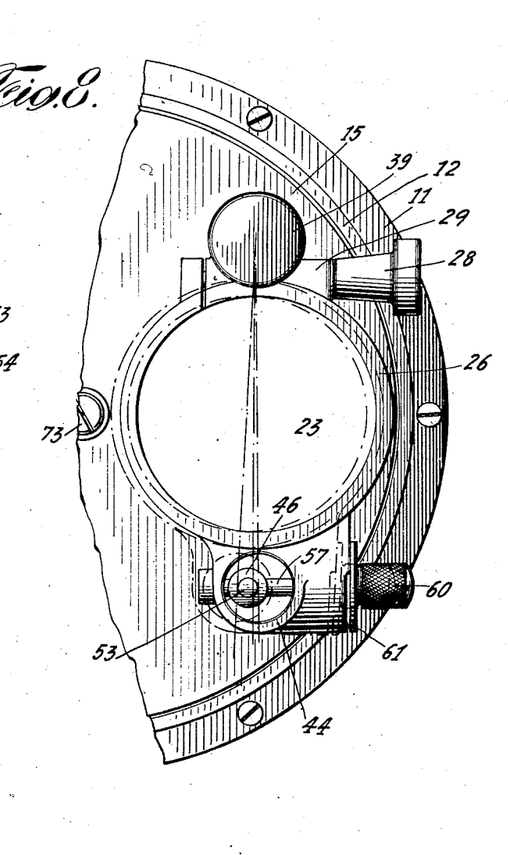
Fig. 8 is an elevation of a portion of the front of the turret indicating the adjustability of one of the lens mounts; and, Fig. 9 is an enlarged elevation of the face of one of the adjusting elements.

*To shift the lenses laterally.*—Referring to Figs. 4 and 7 particularly, the rotation of the thumb piece 60 will rotate the shaft 57 and by the engagement of the tooth 55 in the spiral groove 56 will laterally shift the ear 44 and thus will likewise shift the lens tube in question in the desired direction and this partial rotation will take place around the axis of the bore 32 of turret member 15 since the lens tube carrying the ear 44 is mounted on the sleeve 30 which is slidably and rotatably mounted in said bore. The dotted center lines shown in Fig. 8 indicate the amount of swing given to the lens mounts upon the axis of sleeve 30 to align the lenses with the various optical axes as above mentioned, which correspond to the optical axis of the regular film, the "Movietone" regular film and "Movietone Grandeur" film.

The operation of focusing the lenses will not affect the operation of the shift device since the stub shaft 46 as described can move longitudinally to the limits of the stop pin 50 in either direction. The indicia 62 will tell which axis the tube is in alignment with.

Figure 9:
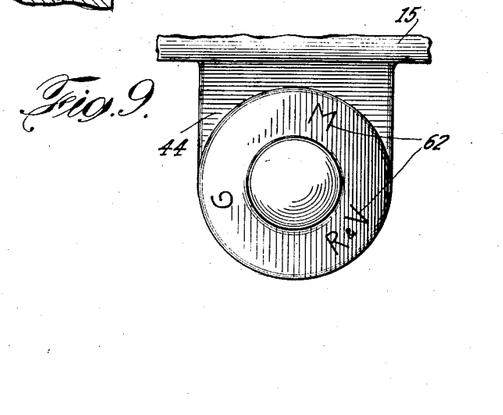

*To operate the film aperture gate.*—When the film has to be threaded or taken out of the machine for one reason or the other, it is necessary to pull back the gate from the aperture plate and when this takes place the light tubes such as 69, 70 and 71 must be moved back with the gate against which they normally are in contact. This is effected by reason of the fact that the tubes above mentioned on the spider 72 can be moved back against the action or resistance of the spring 75. The position of the lenses in the turret with respect to the main projection axis will be indicated by the indicia such as 82, see Fig. 3. In the drawings the indicium labelled N will indicate that the lens with which it is associated is to be used in alignment when "Movietone" film is being used in the machine. The indicium G when a wide or "Grandeur" film is employed. The indicia R and V when a regular or "Vitaphone" film is being employed. These same indicia are used on the dial disk 61, Figs. 7 and 9, to indicate the position of the lens shifting apparatus when these respective films are being employed in the projector.

Preferably the indicia for either turning of the turret or the shifting of the lens mounts are designated not only by characters, but by colors so that each lens has an indicia associated with it of a definite color so that when this colored indicator is noted in the indicating position, the operator can tell what lens is in alignment within without looking at the character. The same idea is employed in connection with the associated device for the lens mount so that the operator can tell by color alone just what associated position any particular lens is in.

Figure 3:
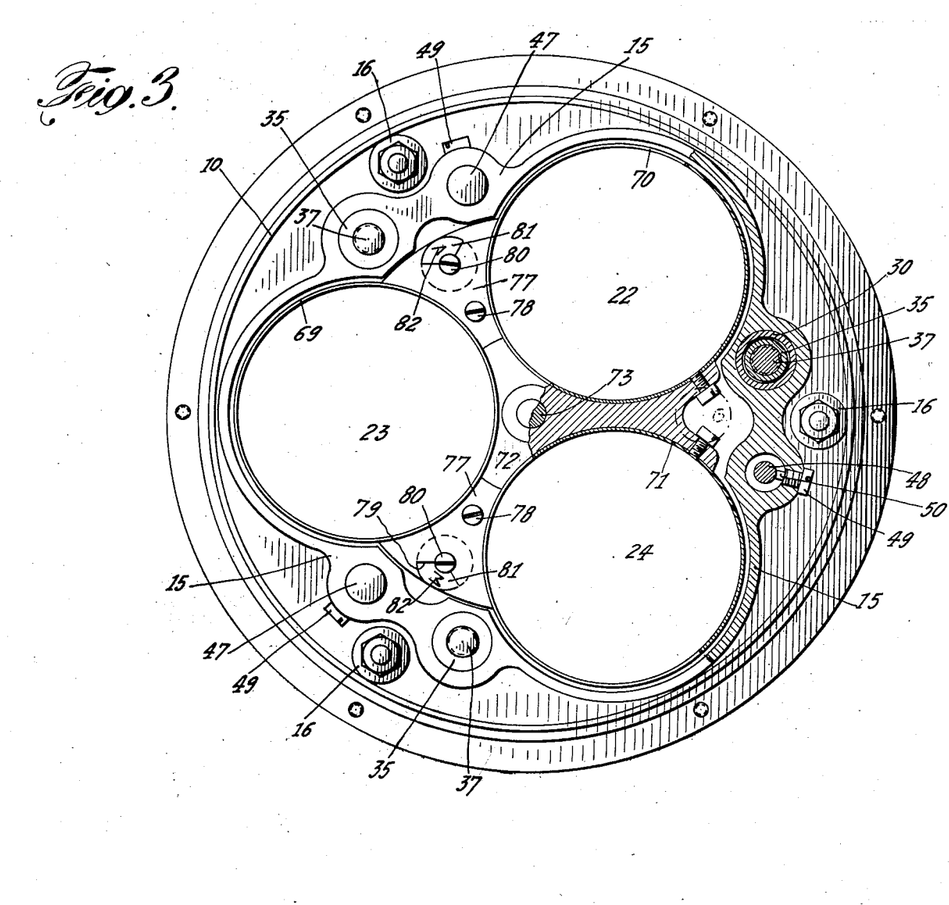
Fig. 3 is a rear elevational view of the turret with certain portions broken away.

*General operation of the machine.*—It will be assumed that the projector is employing a "Movietone" film. In this instance the turret is moved or rotated so that the indicia M is disposed to the right hand position at the rear thereof as shown in Fig. 3 since each indicia refers to the lens tube disposed opposite to it at the back of the turret. The shift thumb piece is then rotated until the indicia M on the dial disk 61 is in position indicating that the axis of the lens has been aligned with the axis of the center of the "Movietone" film. The lens tube can be focussed by means of the knob 39 associated therewith and this can be done while the tube is being shifted or while the turret is being rotated since these various adjustments are independently operable. When the turret is properly aligned the balls will be in the notches and this reception will be felt by the operator so that he will know that the proper position has been achieved. When another film is being used such as the "Grandeur" the operation is repeated to bring the tube marked G opposite the proper axis and the dial disk 61 again manipulated to bring the optical of that lens in alignment with the center of that particular type of film. And so again for the regular film and the "Vitaphone" film the same manipulations are carried out to thereby align the parts as above described. It will be noted that the shifting device and the focussing device has been described in detail and shown in detail with regard to one lens tube but it is to be understood that each tube has a shift and a focussing device and each of these devices can be operated independently of the other. This apparatus permits the introduction of lenses of any desired focal lengths for the films to be run.

It is obvious, therefore, that the invention comprises a simple, compact, rugged device whereby one or more lens mounts on a support are independently, quickly, and easily shifted, preferably laterally around an axis by merely turning a knob connected with the shift shaft. This shaft is cooperatively connected to the mount in any desired manner. As the knob is turned the shaft is shifted to adjust it to align the axes of the lens with the center of the picture section on either a regular film, a "Movietone" film, a "Grandeur" film, or a modified "Grandeur" film for "Movietone" work. In each of these cases the optical center of the picture is, of course, different, thus requiring the lens to be presented in these various different adjusted positions. Preferably on the knob of the shaft itself are disposed colored portions with or without indicia thereon which when presented to the view of the operator will indicate the particular axis with which the lens is aligned.

It will, therefore, be furthermore apparent after a consideration of the description and accompanying drawings that the herein invention provides a compact, rugged support for a plurality of lenses which can be moved in any desired manner to align the lenses successively with the optical axis of the machine, the support being latched in each aligned position and accompanied with an indicating means by characters or colors to instantly denote the position of the support at any particular instant.

The support in the specific form illustrated merely requires that the operator grasp it in his hands and turn it to align the desired lenses. By so doing the latching means automatically comes into play when the proper lens is aligned and the true indicating means is moved into indicating position. The operator can feel the engagement of the latching means so that he instantly knows when the support is in the proper position. The invention herein further embodies the association with the support of a slidable telescopic tube unit and of a shielding and protecting system, this unit specifically as shown being provided with designated indicia in characters and color, so that by opening the door of the projector head, the operator can note what indicia is in the indicating position whereby the character of the aligned lens is turned to him.

Attention is called to applicants' co-pending application Serial No. 507,831 also filed on January 10, 1931 in which application other specific features of the disclosure are specifically claimed.

The present preferred form of the invention has been described and shown in detail and with respect to a present preferred form thereof, but it is not intended to limit the invention to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is:

1. In a motion picture projector, a frame, a movable support thereon, a plurality of movable lens mounts on the support, means associated with the support and the frame for moving the support to bring the lens respectively into projecting position, and means on the mounts and cooperating with means on the support to shift each mount to bring the lens in projection position into optical alignment with any one of several closely related projection axes, and means cooperating between the mount and the support to indicate the particular axis to which the lens is aligned.

2. In a motion picture projector, a movable support on which a plurality of movable lens mounts are disposed, a shaft rotatably disposed on each mount, a shaft in fixed position on the support and capable of sliding and turning thereon, means on the two shafts cooperating with each other to shift the mount when the first shaft is moved, and means on the mount and operated by the first shaft to indicate the position to which the mount has been moved.

3. In a motion picture projector, a frame, a movable support thereon on which a plurality of movable lens mounts are disposed, means for moving said support to align the respective lenses with a projection position, means for shifting each mount to align its lens with any one of several related projection axes, means on the support to indicate to the operator which lens is in the projection position, and means on the mount for indicating to the operator the axis to which the lens has been shifted.

4. In a motion picture projector, a frame, a movable support thereon on which a plurality of movable lens mounts are disposed, means for moving said support to align the respective lenses with a projection position, means for shifting each mount to align its lens with any one of several related projection axes, means on the support to indicate to the operator which lens is in the projection position, means on the mount for indicating to the operator the projection axis to which the lens has been shifted, means on the frame to latch the support in any one of several adjusted positions, and means on the mount to latch the mount in any one of several shifted positions.

5. In a motion picture projector, a frame, a supporting ring thereon, a rotatable turret, disposed within said ring, a plurality of pivoted lens mounts disposed on the turret, means on each mount and cooperating with means on the turret to shift each mount to any one of several related positions, and means on each mount to indicate the position to which the mount has been shifted.

6. In a motion picture projector, a frame, a supporting ring therein, a rotatable turret disposed within said ring and supporting a plurality of pivoted lens mounts, a rotatable shaft on each mount, a shaft in fixed position on the turret capable of sliding and turning therein, means on the two shafts cooperating with each other to shift the mount when the rotatable shaft is moved.

7. In a motion picture projector, a frame, a supporting ring therein, a rotatable turret disposed within said ring and supporting a plurality of pivoted lens mounts, a rotatable shaft on each mount, a shaft in fixed position on the turret and capable of sliding and turning therein, means on the two shafts cooperating with each other to shift the mount when the rotatable shaft is moved, and means on the rotatable shaft to indicate the position to which the mount has been moved.

8. In a motion picture projector, a frame, a supporting ring therein, a rotatable turret disposed within said ring and supporting a plurality of pivoted lens mounts, a rotatable shaft on each mount, a shaft in fixed position on the turret and capable of sliding and turning therein, and associated with each mount, cooperating teeth and grooves on the two shafts to move the mounts when the rotatable shafts are moved.

9. In a motion picture projector, a frame, a supporting ring therein, a rotatable turret disposed within said ring and supporting a plurality of pivoted lens mounts, a rotatable shaft on each mount, a shaft in fixed position on the turret and capable of sliding and turning therein, means on the two shafts cooperating with each other to shift the mount when the rotatable shaft is moved and a dial or disk having indicia thereon and movable with the rotatable shaft to indicate the position to which the mount has been moved.

10. In a motion picture projector, a frame, a supporting ring therein, a rotatable turret disposed within said ring and supporting a plurality of lens mounts, a rotatable shaft on each mount, a shaft in fixed position on the turret and capable of sliding and turning therein and associated with each mount, a tooth on the fixed shaft, said rotatable shaft having a spiral groove therein with which the tooth engages, to move the mount when the rotatable shaft is turned.

11. In a motion picture projector, a frame, a supporting ring therein, a rotatable turret disposed within said ring and supporting a plurality of lens mounts, a rotatable shaft on each mount, a shaft on the turret in fixed position thereon but capable of sliding or turning therein and associated with each mount, a tooth on the fixed shaft, said rotatable shaft having a spiral groove therein with which the tooth engages to move the mount when the rotatable shaft is turned, a dial or disk on the rotatable shaft and having indicia thereon to indicate the position to which the mount has been moved, said fixed position shaft in the turret capable of being longitudinally moved therein with the lens mount, and means on the turret to limit the longitudinal movement of said shaft.

12. In a motion picture projector, a frame, a supporting ring therein, a rotatable turret disposed within said ring and supporting a plurality of lens mounts, a rotatable shaft on each mount, a shaft on the turret in relatively fixed position thereon but capable of sliding and turning therein and associated with each mount, a tooth on the fixed shaft, said rotatable shaft having a spiral groove therein with which the tooth engages to move the mount when the rotatable shaft is turned, a dial or disk on the rotatable shaft and having indicia thereon to indicate the position to which the mount has been moved, said fixed position shaft in the turret capable of being longitudinally moved therein with the lens mount, said shaft having a reduced portion forming shoulders and a stop pin within the turret and engaging with said shoulders to limit the longitudinal movement of the said shaft.

ALBERT KINDELMANN.
EWALD BOECKING.